UNITED STATES PATENT OFFICE.

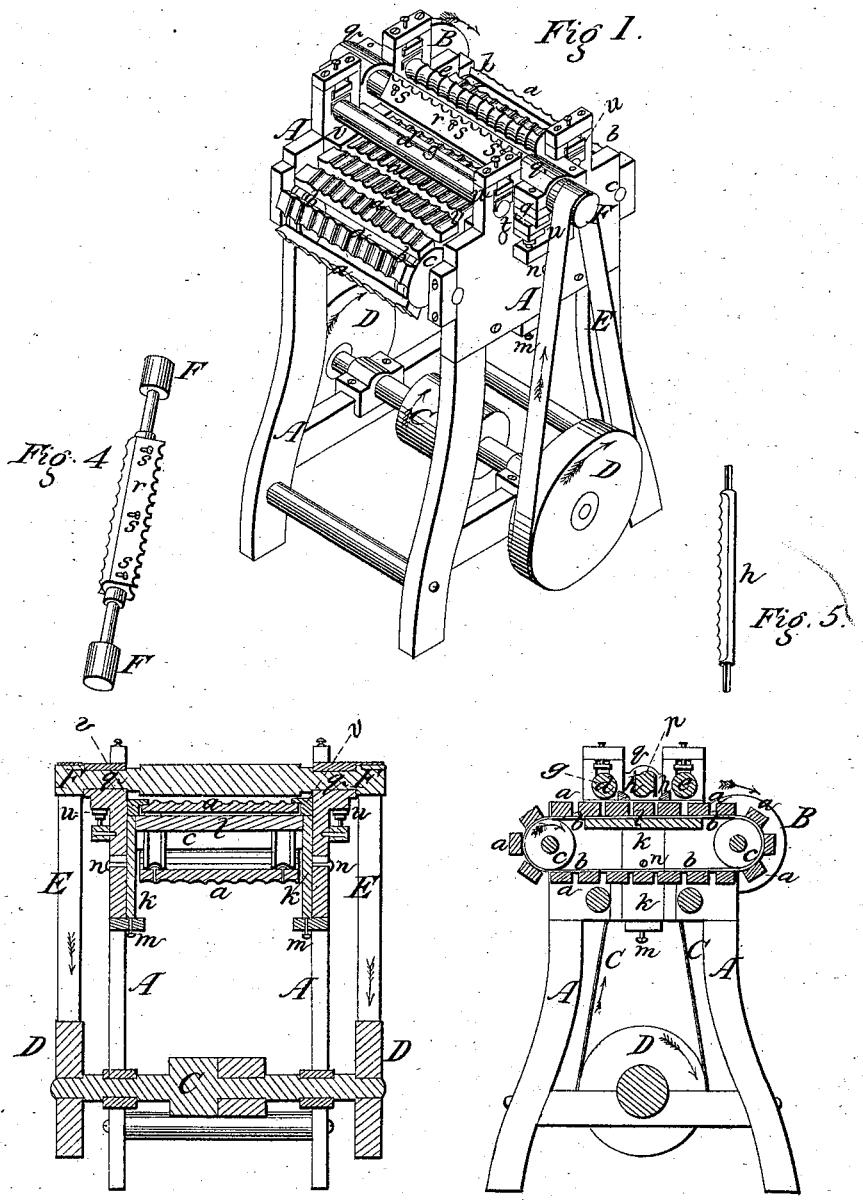

LEANDER W. BOYNTON, OF HARTFORD, CONNECTICUT.

IMPROVEMENT IN MACHINES FOR MAKING SKEWERS.

Specification forming part of Letters Patent No. 53,107, dated March 13, 1866.

*To all whom it may concern:*

Be it known that I, LEANDER W. BOYNTON, of the city and county of Hartford, in the State of Connecticut, have invented a new and useful Improvement in Machinery for Dressing Sticks for Skewers, &c.; and I do hereby declare that the following is a full, clear, and exact description of the construction, character, and operation of the same, reference being had to the accompanying drawings, which make part of this specification, in which—

Figure 1 is a perspective view of the machine complete, showing the cutters, endless chain, feeder, &c. Fig. 2 is a section of the same cut vertically through the center in the longitudinal direction of the cutter-shaft and across the motion of the feeder. Fig. 3 is a section of the same cut vertically through the center at right angles to the cutter-shaft, or in the direction of the motion of the feeder, showing the relative positions of the several parts. Fig. 4 is a perspective view of the cutter-shaft with the cutter attached ready for use. Fig. 5 is a perspective view of one of the pressure-bars, showing the grooves in its lower side.

My improvement consists in making an endless chain or belt feeder, with the blocks or parts so grooved across as to form a grooved or fluted bed on which to feed the material to be wrought, with suitable pressure-rollers and bars to hold the material firm while being wrought, and in making a suitable adjustable bed-plate or support for the central portion of the upper part of the endless feeder, and in making and attaching a suitable cutter-shaft, mounted with suitable cutters, for cutting a convex semicircle (or any other desired shape) through the whole length of the material, having this cutter-shaft revolved or worked by an independent power.

I make the frame A A, &c., of cast-iron, or any other suitable material, and substantially in the form or shape represented in Fig. 1, and indicated in section in Figs. 2 and 3.

I make the blocks or parts of the endless feeder of cast-iron, or any other suitable material, and substantially of the form or shape represented at *a a*, &c., Fig. 1, and indicated in section in Figs. 2 and 3, and attach them in a proper manner to an endless belt or chain, as shown at *b b*, &c., in Fig. 3, and indicated at *b b*, &c., Fig. 1, and I work it on suitable rollers, as shown at *c* and *c*, Figs. 3 and 1.

I groove the blocks across with semicircular grooves, substantially as shown at *a a*, &c., Fig. 1, so as to form a regularly grooved or fluted surface on which to feed the material to the cutters, and on one end of one of the rollers which work the feeding belt or chain I fit a suitable driving-pulley, as shown at B, Figs. 1 and 3.

I make two pressure-rollers to hold the material and sticks securely against the upper surface of the endless-chain feeder—one plain, as *d*, and the other grooved, as *e*, Fig. 1, and indicated at *d* and *e*, Fig. 3, so that the material may be fed under the roller *d* before it arrives at the cutters, and pass out under *e* after being cut; and nearly in contact with the roller *d*, and between this and the cutters, I fit a small plain bar, as shown at *g*, Figs. 1 and 3; and after the cutters, and nearly in contact with the grooved roller *e*, I fit a small bar grooved on the under side, as shown in Fig. 5, and indicated at *h*, Fig. 3, which two bars are designed to hold the material down to the grooved endless feeder, as near as may be to the points of the cutters, to make it firm.

Under the central part of the upper portion of the endless feeder *a a*, &c., (and under the rollers *d* and *e* and the bars *g* and *h*,) I fit an adjustable table or support, as shown in longitudinal section at *l*, Fig. 2, and in transverse section in Fig. 3, which may be elevated or depressed by two adjusting-screws, as *m* and *m*, Fig. 2, and one of them at *m*, Figs. 1 and 3, as the arms or uprights *k* and *k* of this support are held in place by binding-screws working in slots in the frame, as shown at *n* and *n*, Fig. 2, and one of which is seen at *n*, Figs. 1 and 3.

I make the cutter-shaft of cast-steel or any other suitable material, and substantially in the form or shape represented in Fig. 4, (with the cutters attached,) and as indicated in cross-section at *p*, Fig. 3, and in its place in Fig. 1; and I fit its journals in proper bearings, as represented at *q* and *q*, Figs. 1 and 2.

I make the cutters of cast-steel or any other suitable material, substantially of the shape shown at *r*, Figs. 1 and 4, and I secure them to the shaft by screws, as *s s* and *s*, working in slots, as shown in Figs. 1 and 4, so that they can be adjusted as they wear away.

I shape the cutting-edges so that they will leave the surface over which they have worked (or which has passed under them) continued semicircular projections on the side next the cutters. I revolve this cutter-shaft by means of a driving-belt acting on the tight pulley C, through the pulleys D and D and belts E E to the small pulleys F and F, Figs. 1, 2, and 4, so that its motion is entirely independent of the motion of the endless feeder, which is worked by a driving-belt on the pulley B.

In connection with the bearings of the pressure-rollers and bars, where it is deemed necessary, I insert india-rubber or other springs, as at *u u*, &c., Figs. 1 and 2, and I adjust the endless feeder to fit the cutters by means of screws, one of which is shown at *t*, Fig. 1, which works against the blocks *v*, Figs. 1 and 2.

Having made the several parts and arranged them as before described, and properly adjusted the table or support *l*, and prepared the wooden blanks or planchets, (of the thickness of the skewers in the cross-section and twice their length,) I put the machine in motion by applying the power to the driving-pulley C to communicate a rotary motion to the cutter-shaft, Figs. 4 and 1, in the direction indicated by the dart on the belts E E, Figs. 1, 2, and 3, and by applying the power to the driving-pulley B I put the endless feeder in motion in the direction indicated by the dart on the pulley B. I then feed the blank in under the pressure-roller *d*, Fig. 1, and while being carried through the cutter *r* will work off the upper surface of the blank, so as to make it a series of half-rounds or semicircular projections running longitudinally through its whole length; and after running through the desired quantity I elevate the rest *l* to the proper position, (about one-half of the thickness of the blank,) and set the machine in motion, as before, and feed the (half-cut) blank, as before, only I turn the wrought side downward, so that the half-rounds or semicircular projections will rest in the grooves in the endless-chain feeder, so that when it passes through the cutters will cut down the surface of the blank, as before, one-half through the whole thickness, which will leave it in the character of a series of cylindrical sticks, each suited to make two skewers, and they will be held steadily in their places while any portion is left to be cut by the grooves in the endless feeder under them, and by the grooves in the bar, Fig. 5, and in the grooved roller *e*, Fig. 1, above them, so that the sticks will be carried out side by side, and in their regular parallel position to each other, and be deposited in a proper reservoir, ready to be fed to the counting and pointing machine, which will be described in another application.

This machine may be used to dress sticks for other uses, and the cutters may be so shaped as to dress sticks or pieces of any desired conformation in the cross-section, and the two sides may be made unlike, as the cutters may be changed after cutting the first side or surface, if desired.

What I claim as my invention, and desire to secure by Letters Patent, is—

The combination of the endless-chain feeder with the cutter-shaft and its cutters and the grooved bar or grooved roller, when they are constructed, arranged, and operating substantially as herein described and set forth.

L. W. BOYNTON.

Witnesses:
   JAS. A. AUSTIN,
   R. FITZGERALD.